Patented May 19, 1942

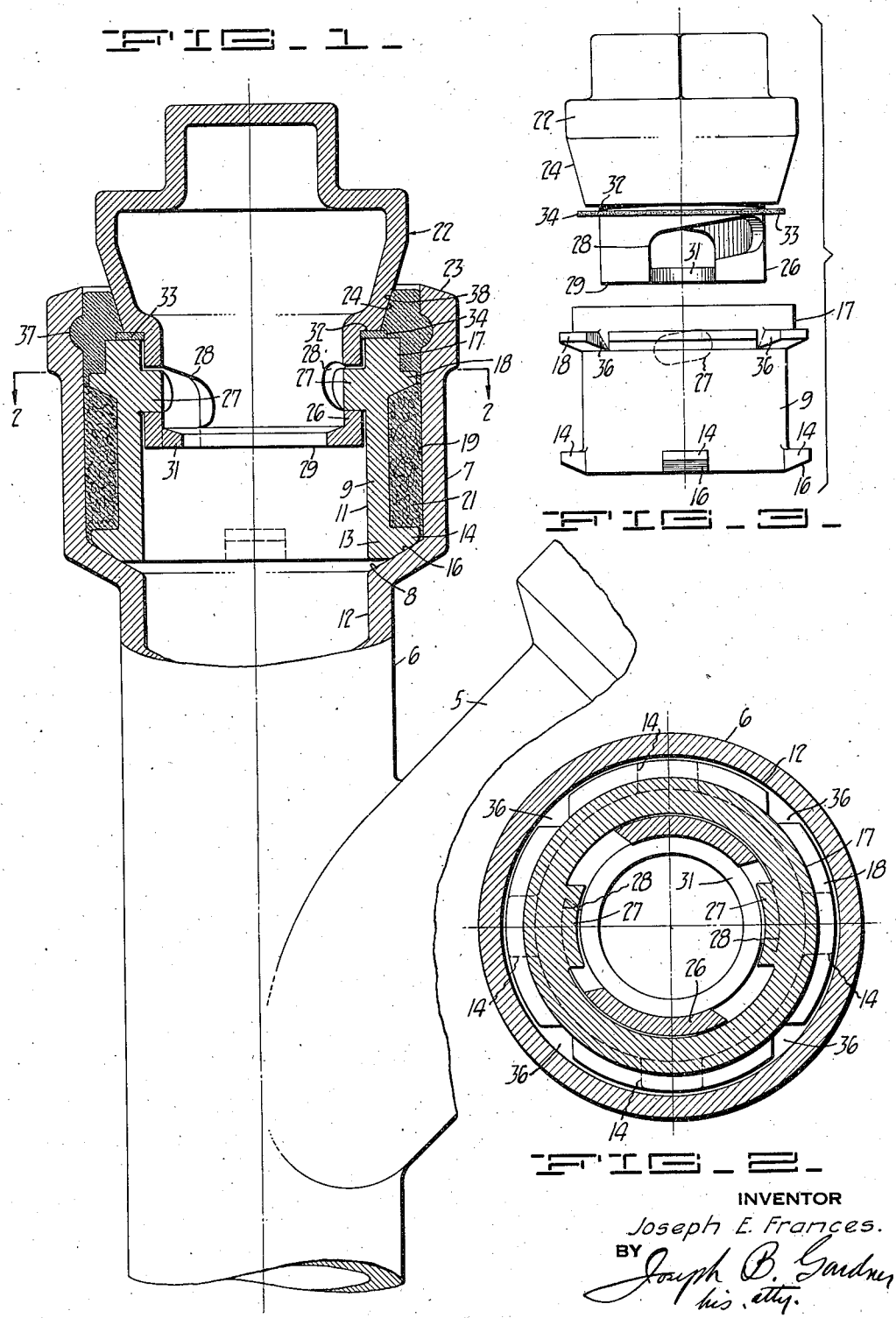

2,283,672

UNITED STATES PATENT OFFICE 2,283,672

PIPE CONNECTION FOR PLUGS AND THE LIKE

Joseph E. Frances, Oakland, Calif.

Application August 12, 1940, Serial No. 352,297

9 Claims. (Cl. 138—89)

The invention relates to pipe connections generally and more particularly to a plug connection for waste pipe and the like.

An object of the invention is to provide an improved form of connection for clean-out plugs in waste pipe lines whereby such plugs may be readily inserted and positively sealed in the waste pipe and yet capable of removing to gain access to the pipe for cleaning out or the like and replacement of the plug with a positive seal ensured upon replacement. Heretofore it has been the practice to thread cleanout plugs into a branch of a waste pipe line and it has been necessary, because of the threaded construction used, to lead or tar the threads and to also test the seal of the plug after insertion of the same in order to ensure against leakage. Similarly, removal and replacement of such a plug entails a re-packing of the threads and re-testing. In accordance with the present invention and as an important feature thereof, the plug is sealed in the waste line by lead or other casting metal which is cast around the plug and calked to ensure a positive seal and the plug is so formed as to permit its withdrawal from the lead seal without damaging the seat provided by such seal, whereby the plug may be replaced and when screwed home will have the same positive seal as originally provided.

Another object of the invention is to provide a pipe joint of the character above which provides in addition to the cast metal seal, a second gasket seal which is permanently held within the joint for engagement with the clean-out plug or other member attached to the joint.

A further object of the invention is to provide a pipe connection of the character described wherein the connected members are positively held against relative rotational and longitudinal displacement and wherein the attachment and detachment of the connected member may be simply and readily effected.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of a pipe fitting to which the connection of my invention is applied.

Figure 2 is a transverse sectional view taken on the line 2—2 of Figure 1.

Figure 3 is a side view of the plug and plug receiving member of the connection unit.

The pipe connection of the present invention consists briefly in the combination of a pipe having an open end of a sleeve inserted into the pipe end, a member inserted into said pipe end and detachably secured to the sleeve, and casting metal cast and calked into the end of the pipe around the detachable member and against the sleeve to lock in the sleeve and to hold the latter against longitudinal or rotational displacement and to positively seal the detachable member in the pipe end, the detachable member having a peripheral form permitting a forced withdrawal from the pipe end while leaving the cast metal seat thereagainst intact for re-engagement with the member upon re-attachment of the member. Other improved features of the present joint will be more readily apparent in the following description.

With reference to the accompanying drawing, the pipe connection is here shown in conjunction with a waste pipe section 5 having a clean-out branch 6 provided with an enlarged bell hub end 7 which is so constructed as to define an interior annular shoulder 8 at the inner end of the bell hub 7 where the bell hub joins the main pipe section. Mounted in the interior of the hub is a sleeve 9, preferably having the interior wall 11 thereof generally aligned with the interior wall 12 of the main pipe section, the sleeve being inserted into the open end of the hub so as to engage the inner end 13 of the sleeve against the shoulder 8. Preferably, the end 13 is provided with an outwardly offset abutment 14 which engages the shoulder and as here shown, this abutment is in the form of a plurality of circumferentially spaced radially extending lugs having end surfaces 16 inclined outwardly in substantial conformity to the taper of shoulder 8 so as to wedge against the taper and assist in centering the sleeve within the hub. The sleeve 9 is preferably formed at its opposite outer end 17 with an annular enlargement 18 which cooperates with the interior wall 19 of the hub to hold the sleeve in central longitudinal alignment in the hub. Preferably the space defined between the longitudinally spaced portions 14 and 18 and the sleeve and between the outer peripheral wall 21 of the sleeve and the interior peripheral wall 19 of the hub is packed with a suitable sealing material such as oakum in order to seal the sleeve in place and against leakage.

The connected member 22 of the joint is inserted into the open hub end and detachably secured to the other end of the sleeve. As here shown, the member 22 is a closure plug, although as will be understood, other pipe closures or pipe sections might be used. As will be seen from the drawing, the outer end 17 of the sleeve is spaced inwardly from the open end 23 of the hub so that a portion 24 of the length of the member 22 will lie within the open end of the hub and will be surrounded by a portion of the interior wall 19 of the hub. In accordance with the present construction, the inner end portion 26 of the member 22 is inserted within the interior wall 11 of the sleeve and is there rotatably connected to the sleeve. Preferably some type of threaded connection means is used between the member end 26 and the sleeve and as here shown, a bayonet threaded connection is used. As part of this connection, the sleeve 9 is provided with an interiorly projecting lug 27 which is adapted to engage in a bayonet slot 28 formed in the end wall 26 of the member 22. Preferably the slot 28 extends completely through the wall portion 26 and opens downwardly to the end face 29 of the wall portion, whereby the lug may be engaged within the slot upon longitudinal insertion of the member 22 and appropriate rotation of the member. It will also be noted that the slot 28 is inclined longitudinally so as to effect a drawing of the plug inwardly of the joint upon rotation thereof. While the positions of the lug and slot on the attached member and sleeve might be reversed, that is placing the lug on the member and the slot on the sleeve, the construction as here illustrated is preferred for the reason that the slot in the member may be readily cleaned of any attaching or clogging waste material when the plug is removed, whereas if the slot were provided in the sleeve which is permanently held in the pipe end, such cleaning would be rendered substantially more difficult. Preferably the bayonet connection is provided on diametrically opposite sides of the sleeve and member end so that a pair of diametrically opposite pins 27 and diametrically opposite slots 28 are used. Also in order to properly reenforce the open end 29 of the member, while providing desirable lightness in weight, I prefer to form such end with an interior annular flange 31 which bridges the open ends of the slots and provides a rigid inner end construction for the member, notwithstanding the cutting of the slots completely through the side wall thereof.

The wall portion 24 of the connected member 22 is formed at its inner end with a shoulder 32 which is spaced from the end 17 of the sleeve so as to receive and compress a gasket 33 therebetween. This gasket may be formed of any suitable material, although a fibre gasket is preferred. As will be seen from the drawing, the outer periphery 34 of the gasket extends somewhat outwardly from the wall portion 24 of the member. In accordance with the present invention and as an important feature thereof, the wall portion 24 of the connected member is spaced inwardly from the interior wall 19 of the hub so as to define therebetween an annular space extending completely around the wall portion 24. It will also be seen that the inner extremity of this space is defined by the end 17 of the sleeve and the sleeve flange 18 and that the outer periphery 34 of the gasket also extends into this space. In accordance with the present invention this space is filled with a suitable casting metal such as lead or the like, which is cast and calked into the space around the wall portion 24 and against the sleeve end and the flange 18 and against the gasket 33, so as to positively lock in the sleeve and gasket and to positively seal the wall portion 24 of the connected member. In this manner the gasket and the sleeve are permanently embedded into the pipe hub. Desirably, the flange 18 is suitably notched as at 36 so as to receive the casting material into the notches and key the sleeve with the casting material to prevent relative rotation therebetween. Also desirably, the interior wall 19 of the hub is provided with an anular recess 37 adjacent the outer end 23 thereof which receives and locks in the casting metal.

In accordance with the present construction, the sealed-in wall portion 24 of the connected member has a peripheral form permitting a forced rotation and longitudinal withdrawal of the member. As will be seen from the drawing, the wall portion 24 has an inverted conical formation which is circular in cross-section, thereby permitting rotation and divergently tapers outwardly so as to permit longitudinal withdrawal. The tapered form of the wall portion 24 provides a correspondingly tapered form of the wall 38 of metal cast thereagainst and which provides a seat for the wall. Accordingly upon withdrawal of the connected member, the wall 38 of the cast metal is left unimpaired and intact to provide a re-seating and sealing of the member when the same is replaced in the joint. Also, since the metal is cast and calked in the joint only after the member 22 is attached and forcibly held against the gasket 33, a double seal of the member, that is the metal-to-metal seal along the wall 24 and the gasket seal at the shoulder 32, is at all times ensured. Thus when the connected member is replaced after withdrawal, the wall portion 24 will engage the tapered cast metal wall simultaneously with the engagement of the shoulder against the gasket and as the member is screwed home, the double seal is simultaneously effected.

I claim:

1. In combination with a pipe having an open end, a sleeve inserted into said pipe and having the outer end thereof longitudinally spaced inwardly from said pipe end, a member inserted into said pipe and having a rotary attachable and detachable connection to said sleeve and having its periphery spaced from the interior of said pipe to define an annular space therebetween, a portion of said sleeve projecting laterally into said space, and casting metal cast and calked into said space and against said sleeve portion to lock said sleeve into said pipe end and to seal said member therein; the periphery of said member being circular in cross section and tapered towards its inserted end so as to permit rotation in and longitudinal withdrawal of said member from said casting metal and to provide a correspondingly tapered wall on the interior periphery of said casting metal against which the periphery of said member may be seated upon re-attachment to said sleeve after withdrawal therefrom.

2. In combination with a pipe having an open end, a sleeve inserted into said pipe and having the outer end thereof longitudinally spaced inwardly from said pipe end, a member inserted into said pipe end and fitting into said sleeve, bayonet connection means attaching said member and sleeve; and casting metal cast and calked into said pipe end about said member to lock in said sleeve and to seal said member, said member having an outer peripheral form permitting rotation and longitudinal withdrawal of said member relative to said cast member to attach and detach said member and sleeve by said connection means.

3. In combination with a pipe having an open end, a sleeve inserted into said pipe and having the outer end thereof longitudinally spaced inwardly from said pipe end, a member inserted into said pipe end and interiorly of said sleeve, an interiorly projecting lug on said sleeve, said member being formed with a bayonet slot opening to the inserted end thereof and coacting with said lug to attach said member to said sleeve upon relative rotation and longitudinal movement of said member and sleeve, and casting metal cast and calked in said pipe end about said member to lock in said sleeve and to seal said member, said member having a peripheral form permitting said rotary and longitudinal movement relative to said casting metal.

4. In combination with a pipe having an open end, a sleeve inserted into said pipe and having the outer end thereof longitudinally spaced inwardly from said pipe end, a member having a cylindrical wall inserted into said pipe end and interiorly of said sleeve, an interiorly projecting lug on said sleeve, said member wall having a bayonet slot extending completely through said wall and opening to the inserted end of said member and coacting with said lug to effect an attachment and detachment of said member and sleeve upon relative rotation and longitudinal movement of said member and sleeve, said member wall having an interior circumferential flange at the inserted end thereof bridging and reenforcing the open end of said slot, and casting metal cast and calked in said pipe end about the outer periphery of said member to lock in said sleeve and seal said member, said member periphery being circular in cross-section and of such longitudinal form as to permit said rotary and longitudinal movement relative to said casting metal.

5. In combination with a pipe having an open end, a sleeve inserted into said pipe in longitudinally spaced relation to said end, a member inserted into said pipe in longitudinally spaced relation to said end and having a rotary attachable and detachable connection to said sleeve and having the outer side thereof spaced from the interior wall of said pipe end to define a space around said member, a portion of said sleeve projecting laterally into said space, and casting metal cast and calked into said space and against said sleeve portion to lock said sleeve into said pipe end and to seal said member therein, said member having a peripheral form permitting rotation and longitudinal withdrawal from said metal, said sleeve portion having a form interlocking with said casting metal to prevent relative rotation between said sleeve and casting metal.

6. In combination with a pipe having an enlarged open bell hub end formed with an interior shoulder connecting the pipe and hub, a sleeve inserted into said hub and having an interior diameter substantially equal to the interior diameter of said pipe and formed with an offset abutment on the inserted end of said sleeve engaged with said shoulder, said sleeve being formed with a notched circumferential flange adjacent its opposite end, oakum packed into the space surrounding said sleeve interiorly of said hub and between said abutment and flange, a plug inserted into said hub and having a rotary attachable and detachable connection to said sleeve and having a circular periphery spaced from the interior wall of said hub, and a casting metal cast and calked into the outer end of said hub surrounding said plug periphery to seal the latter and bearing against said flange to lock said sleeve against longitudinal and rotational displacement relative to said hub.

7. In combination with a pipe having an enlarged open bell hub end formed with an interior tapered shoulder connecting the pipe and hub, a sleeve inserted into said hub and having an interior diameter substantially equal to the interior diameter of said pipe and formed with a plurality of circumferentially spaced lugs on the inserted end of said sleeve and having inclined forward surfaces adapted to engage and wedge against said shoulder, said sleeve being formed with a notched circumferential flange adjacent its opposite end, oakum packed into the space surrounding said sleeve interiorly of said hub and between said lugs and flange, a plug inserted into said hub and having a rotary attachable and detachable connection to said sleeve and having a circular periphery spaced from the interior wall of said hub, and a casting metal cast and calked into the outer end of said hub surrounding said plug periphery to seal the latter and bearing against said flange to lock said sleeve against longitudinal and rotational displacement relative to said hub.

8. In combination with a pipe having an open end, a sleeve inserted into said pipe with the outer end of said sleeve spaced inwardly of said pipe end, a plug inserted in said pipe end and having a rotary attachable and detachable connection to said sleeve, a shoulder on said plug spaced from the outer end of said sleeve, a gasket compressed between said shoulder and said sleeve end and projecting laterally from said shoulder, and a casting metal cast and calked into said pipe end about said plug and against said gasket and said sleeve end to lock in said sleeve and gasket and to seal said plug, the outer periphery of said plug being circular in cross section and tapered towards the inserted end of said plug to permit rotation and longitudinal withdrawal of said plug relative to said cast metal to attach and detach said plug and sleeve.

9. In combination with a cylindrical pipe having an open end and an interior shoulder longitudinally spaced from said end and an annular recess in the interior wall of said pipe adjacent said end, a cylindrical sleeve inserted into said pipe end and against said shoulder and having the outer end thereof spaced inwardly from said pipe end, a plug member having a cylindrical end portion inserted in said sleeve and having a rotary attachable and detachable connection thereto, and an annular shoulder spaced from said outer sleeve end and having an inverted conical periphery extending outwardly from said shoulder and lying within said pipe end and spaced from the interior wall thereof, a gasket compressed between said sleeve end and said shoulder and projecting outwardly from said shoulder, and casting metal cast and calked in said pipe end around said member and gasket and in said recess and against said sleeve to lock in said sleeve and gasket and seal said member.

JOSEPH E. FRANCES.